United States Patent [19]

Greenberg

[11] 4,025,433
[45] May 24, 1977

[54] MAGNETIC SEPARATING APPARATUS

[75] Inventor: Donald K. Greenberg, Rockford, Ill.

[73] Assignee: Barnes Drill Co., Rockford, Ill.

[22] Filed: Jan. 22, 1976

[21] Appl. No.: 651,339

[52] U.S. Cl. .............................. 210/223; 210/258; 210/298; 210/396
[51] Int. Cl.² ...................................... B01D 35/06
[58] Field of Search .......... 210/298, 222, 223, 396, 210/258; 209/222

[56] References Cited

UNITED STATES PATENTS

| | | | |
|---|---|---|---|
| 2,459,343 | 1/1949 | Schuner | 210/222 |
| 2,678,729 | 5/1954 | Spody | 210/222 |
| 2,688,403 | 9/1954 | Anderson | 210/222 |
| 2,736,432 | 2/1956 | Gardes | 210/222 |
| 2,772,778 | 12/1956 | Furey | 210/222 |
| 3,139,403 | 6/1964 | Cramer et al. | 210/222 |
| 3,334,749 | 8/1967 | Ladd | 210/298 |
| 3,712,472 | 1/1973 | Elliott | 210/222 |
| 3,840,120 | 10/1974 | Greenberg | 210/396 |

*Primary Examiner*—Theodore A. Granger
*Attorney, Agent, or Firm*—Leydig, Voit, Osann, Mayer and Holt, Ltd.

[57] ABSTRACT

A slotted pipe is rotatably supported in a drag tank and communicates with the suction line of a pump. Magnetic discs are rotatable with the pipe and serve to attract and catch magnetic particles in liquid flowing to the pipe so as to prevent such particles from entering the pump. A scraper is positioned adjacent the rotatable discs and pipe to brush the caught particles therefrom and direct the particles to the bottom of the tank.

9 Claims, 6 Drawing Figures

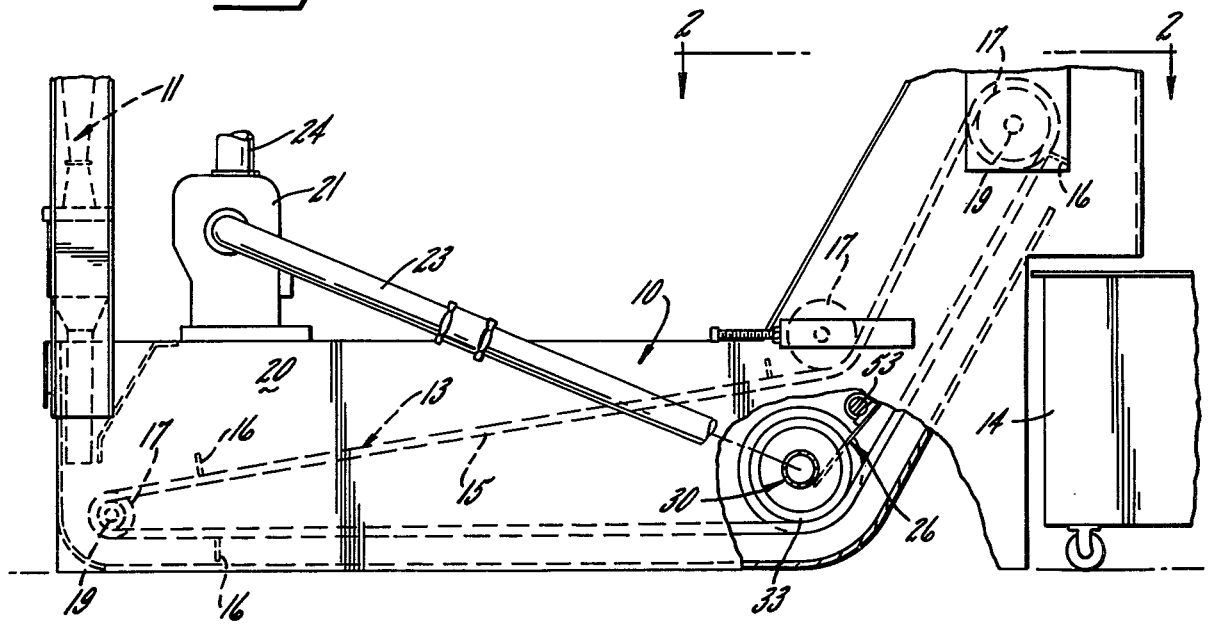
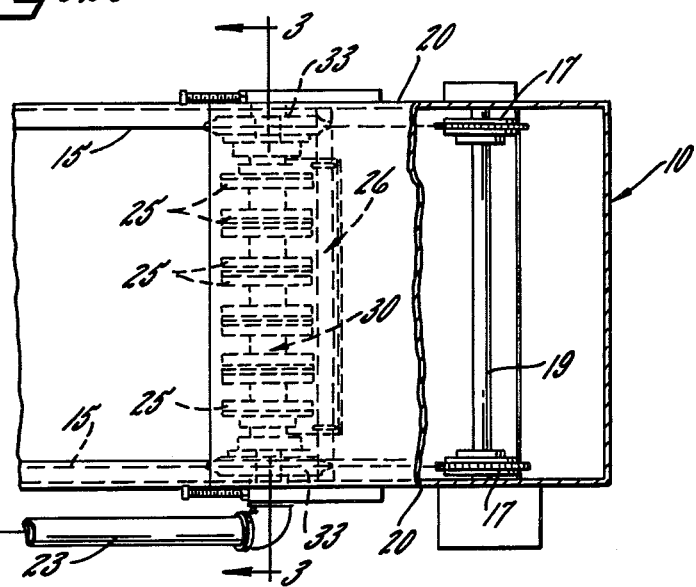
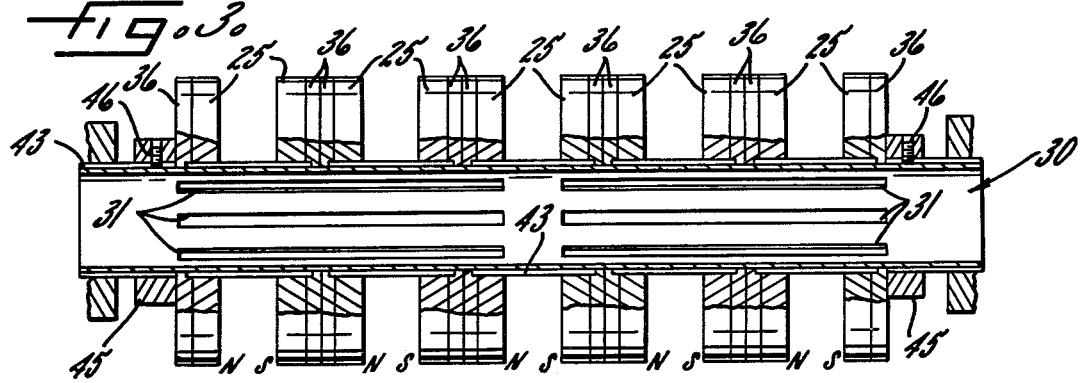

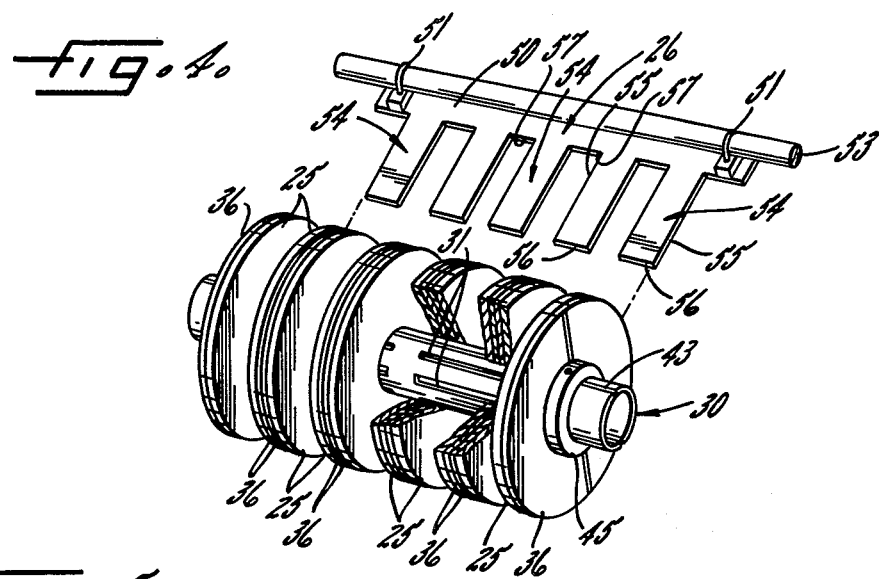
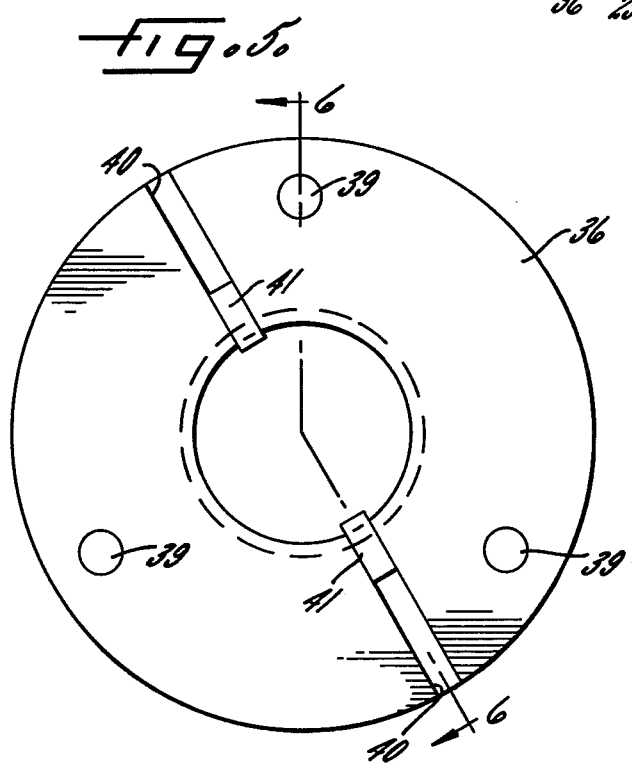
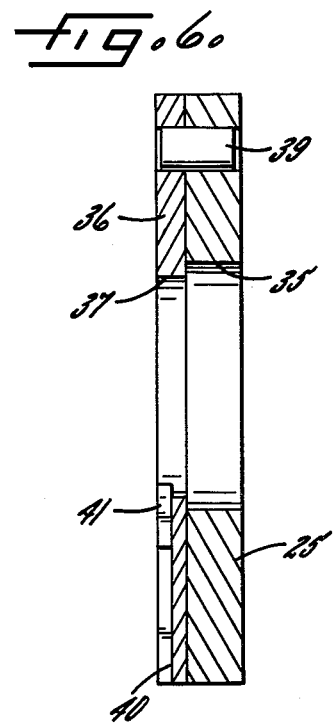

MAGNETIC SEPARATING APPARATUS

BACKGROUND OF THE INVENTION

This invention relates to apparatus for separating chips and other solid particles from dirty liquid such as machine tool coolant and for delivering a flow of cleaner liquid to further cleaning apparatus or to a using system. More particularly, the invention relates to apparatus of the same general type as disclosed in my U.S. Pat. No. 3,840,120 in which dirty liquid is delivered to a tank where extremely heavy particles settle from the liquid. The liquid then is sucked out of the tank by a pump and is delivered under pressure to additional cleaning apparatus such as a hydroclone separator.

To prevent large particles from beng sucked into the pump, the apparatus disclosed in my aforementioned patent includes a perforated screen which is telescoped over the suction line of the pump and which serves to catch large chips and the like while allowing liquid to pass into the suction line, the screen being rotated past a scraper which brushes the chips from the screen and directs the chips to the bottom of the tank. The screen functions well in some applications but is effective to catch only relatively large chips and, in spite of the presence of the scraper, is susceptible to becoming clogged by chips which become tightly lodged in the perforations.

SUMMARY OF THE INVENTION

The general aim of the present invention is to provide apparatus of the foregoing type which more effectively catches comparatively small particles and prevents such particles from being sucked into the pump and which, at the same time, is better able to discharge the caught particles to the bottom of the tank so as to reduce the danger of the particles accumulating and restricting the flow of liquid into the pump.

A more detailed object is to achieve the foregoing through the provision of magnetic plates which are spaced along and carried by an apertured pipe adapted to communicate with and rotate relative to the suction line of the pump. The plates attract and capture particles in the liquid sucked toward the pipe and are continuously cleaned by a scraper which sweeps the particles from the plates and toward the bottom of the tank as the plates rotate.

The invention also resides in the novel arrangement of the magnetic plates on the pipe and in the unique construction of the scraper, the latter not only cleaning all portions of the magnetic plates but also serving to sweep particles off of the pipe itself.

These and other objects and advantages of the invention will become more apparent from the following detailed description when taken in conjunction with the accompanying drawings.

BRIEF DESCRIPTION OF THE DRAWINGS

FIG. 1 is a side elevational view of new and improved apparatus embodying the novel features of the present invention, certain parts being broken away and shown in section.

FIG. 2 is a fragmentary view taken substantially along the line 2—2 of FIG. 1.

FIG. 3 is an enlarged fragmentary cross-section taken substantially along the line 3—3 of FIG. 2.

FIG. 4 is an exploded perspective view of the pipe, the magnetic plates and the scraper.

FIG. 5 is a face view of one of the magnetic assemblies.

FIG. 6 is a cross-section taken substantially along the line 6—6 of FIG. 5.

DETAILED DESCRIPTION OF THE PREFERRED EMBODIMENT

As shown in the drawings for purposes of illustration, the invention is embodied in apparatus for separating metal chips, swarf grit and the like from a flow of machine tool coolant and for returning a supply of clean coolant to a machine using system served by the apparatus. The present apparatus is generally similar to that disclosed in my aforementioned patent —to which reference may be had for details of construction— and thus only so much of the apparatus as is necessary to an understanding of the present invention will be described herein.

In general, the apparatus includes a tank 10 to which dirty liquid is delivered to enable heavy chips and particles to settle from the liquid prior to the liquid being pumped to one or more hydroclone separators 11 for removal of the finer particles before the liquid is returned to the using system. The tank is basically a conventional drag tank of sheet metal construction and having a power-driven drag conveyor 13 for picking up settled-out solids from the bottom of the tank and for discharging such solids into a waste receptacle 14. The conveyor includes a pair of endless chains 15 carrying drag bars 16 and supported on sprocket wheels 17 suitably mounted on horizontal shafts 19 extending between the side walls 20 of the tank. One of the shafts, herein the uppermost shaft, is power driven in a conventional manner to cause the lower runs of the chains 15 to advance from left to right as viewed in FIG. 1.

Liquid in the drag tank 10 is delivered to the hydroclone separator 11 by a pump 21 (FIG. 1) having a suction or inlet line 23 which communicates with the interior of the tank through an opening in one of the side walls 20 thereof. A discharge line 24 is connected to the outlet of the pump and leads to the inlet of the hydroclone.

While extremely heavy chips sink to the bottom of the tank 10, other chips and particles remain in suspension in the liquid and are drawn toward the suction line 23 of the pump 21 when the latter is operated. To reduce the volume of solid material drawn into the pump, the present invention contemplates the unique provision in the tank of a series of axially polarized magnetic plates 25 which attract and catch ferrous and other magnetic particles as such particles flow toward the suction line 23. In carrying out the invention, the plates are continuously rotated past a novel scraper 26 which brushes the caught particles from the plates and directs the particles toward the bottom of the tank for removal by the drag conveyor 13.

More specifically, the magnetic plates 25 are supported to rotate with an apertured pipe 30 which extends between the side walls 20 of the tank 10 and which communicates with the suction line 23 of the pump 21, the pipe being submerged in the liquid in the tank. The pipe is made of stainless steel, polyvinyl chloride or other paramagnetic material and is formed with a series of angularly spaced openings 31 (FIGS. 3 and 4) which herein are shown as being two axially spaced sets of elongated slots spaced around and formed through the pipe. The pipe is rotatably journaled at its ends in openings in the side walls 20 of the tank 10 with one end of the pipe being directly alined with the inlet end of the suction line 23 so that liquid flowing into the pipe through the slots 31 may flow to the suction line and thence to the pump 21. Sprocket wheels 33 (FIG. 2) are fixed to the end portions of the pipe and engage the chains 15 so that the pipe is rotated continuously in a counterclockwise direction (FIG. 1) whenever the drag conveyor 13 is operated.

The magnetic plates 25 are in the form of circular discs which are made from any suitable ceramic permanent magnet material such as barium cobaltite. Each magnetic disc 25 is formed with a central opening 35 (FIG. 6) somewhat larger in diameter than the pipe 30 and is attached in face-to-face contact with a supporting plate 36 made of soft iron or other magnetically permeable material and having a central opening 37 whose diameter is substantially equal to the outside diameter of the pipe. Herein, the magnetic discs 25 are attached to the iron plates 36 by angularly spaced roll pins 39 fitted into axially extending holes in the discs and plates although the discs could be bonded in face-to-face contact with the plates by epoxy or the like. To secure the magnetic discs 25 for rotation with the pipe, each supporting plate 36 is formed with two radially extending and diametrically spaced holes 40 (FIG. 5) which receive dowel pins 41. The inner ends of the dowel pins project into axially extending and diametrically spaced keyways 43 (FIGS. 3 and 4) formed in the pipe and thus serve to key the discs and plates for rotation with the pipe.

In this instance, ten magnetic discs 25 are spaced along the pipe 30 with two of the discs being end discs and being captivated against outward shifting along the pipe by collars 45 (FIGS. 3 and 4) telescoped over the pipe and secured to the latter by set screws 46 fitted into one of the keyways 43. The end discs are arranged on their respective plates 36 and the pipe so that the north pole of one of the end discs (herein, the left disc as viewed in FIG. 3) faces inwardly while the south pole of the other end disc faces inwardly. The remaining eight discs are arranged in four axially spaced pairs with the supporting plates 36 of each pair being positioned in face-to-face contact with one another between the discs whereby to form a sandwich comprising a magnetic disc, two supporting plates and then another magnetic disc. The discs of each sandwich are arranged with the south pole of the left hand disc facing toward the left (FIG. 3) and with the north pole of the right hand disc facing toward the right. Accordingly, all ten disc are positioned with poles of like polarity facing in the same direction and thus adjacent poles of adjacent magnets are of opposite polarity.

With the foregoing arrangement, magnetic particles in the liquid flowing toward the pipe 30 are attracted to and caught by the faces of the magnetic discs 25 and thus such particles are prevented from being sucked into the pipe and delivered to the pump 21. Accordingly, less solid material flows to the pump and the hydroclone separator 11 thereby to avoid possible damage and overloading of those mechanisms. The particular arrangement of the discs 25 and the plates 36 on the pipe 30 establishes good magnetic fields for attracting the particles and also reduces flux leakage between the discs so as to decrease the attraction of particles to and the accumulation of particles on the inner and outer surfaces of the pipe.

The scraper 26 serves the important function of brushing the attracted particles from the rotatable discs 25 and the plates 36 and directing the particles toward the bottom of the tank 10. As shown most clearly in FIG. 4, the scraper comprises an elongated bar 50 which is secured by U-bolts 51 to a fixed horizontal rod 53 extending between the side walls 20 of the tank 10, the bar being made of paramagnetic material such as polyvinyl chloride. Projecting fingers 54 are formed integrally with and spcaed along one edge portion of the bar and are positioned between adjacent magnetic discs 25 with a close but running fit. The fingers act to maintain the axial spacing between the discs and are inclined downwardly and so positioned with respect to the direction of rotation of the discs that caught particles engage the underside of the fingers and are directed toward the bottom of the tank 10. Opposite side edges 55 (FIG. 4) of the fingers scrape particles from the faces of the discs while the free ends 56 of the fingers rub against the external surface of the pipe 30 and brush off any particles accumulating on such surface. Those edge portions 57 of the bar 50 between the fingers 54 lightly engage the peripheral surfaces of the discs 25 and plates 36 and thus brush particles off of the peripheral surfaces.

From the foregoing, it will be apparent that the present invention brings to the art new and improved liquid cleaning apparatus in which particles which otherwise would be sucked into the pump 21 are caught by the magnetic discs 25 and then are effectively swept to the bottom of the tank 10 by the scraper 26. The discs are capable of catching relatively small particles and are not susceptible to becoming clogged or otherwise accumulating a build up of particles after extended service use. Accordingly, the present apparatus is comparatively more effective and trouble-free in operation than prior apparatus used for the same general purpose.

I claim:

1. Apparatus for separating particles out of a flow of dirty liquid and for delivering a flow of cleaner liquid, said apparatus having a settling tank for receiving the flow of dirty liquid, and a pump having a suction line and a discharge line, the improvement in said apparatus comprising, an elongated pipe communicating with and rotatable relative to said suction line and submerged within said tank, said pipe being radially rigid and having a series of inlet openings extending along part of its length and spaced angularly around its periphery whereby liquid in said tank may be sucked radially through said openings and into said suction line, a series of plate-like permanent magnets rotatable with and spaced axially along said pipe adjacent said inlet openings with the poles of said magnetics facing axially to catch particles in the liquid flowing toward said openings, means for power rotating said pipe thereby to rotate said magnets in unison, and a scraper positioned within said tank for removing caught particles from said magnets and said pipe as an incident to rotation thereof, said scraper having surfaces located to scrape particles from at least one pole of each of said magnets and further having additional surfaces located to scrape particles from those surfaces of said pipe diposed between said magnets.

2. Apparatus as defined in claim 1 in which said scraper comprises an elongated bar and further comprises a series of fingers spaced axially along and projecting from one edge of said bar, said fingers being positioned between said magnets with the side edges of said fingers being located to scrape particles from the poles of adjacent magnets.

3. Apparatus as defined in claim 2 in which said magnets comprise circular discs, the edge portions of said bar etween said fingers being located to scrape particles from the circular peripheries of said magnets.

4. Apparatus as defined in claim 3 in which the free ends of said fingers are located to scrape particles from those surfaces of said pipe disposed between said magnets.

5. Apparatus as defined in claim 1 in which said magnets are positioned on said pipe with their poles of like polarity all facing in the same direction.

6. Apparatus as defined in claim 1 in which said magnets are positioned on said pipe such that adjacent poles of adjacent magnets are of opposite polarity, and further including plates of magnetically permeable material located in face-to-face contact with the non-adjacent poles of at least some magnets.

7. Apparatus as defined in claim 1 in which at least some of said magnets are paired together on said pipe, the magnets of each pair being positioned with their poles of like polarity facing in the same direction, and plate means of magnetically permeable material disposed between the magnets of each pair and located in face-to-face contact with the adjacent poles of such magnets.

8. Apparatus as defined in claim 1 in which two of said magnets comprise end magnets, said end magnets being positioned with the north pole of one of the end magnets facing the south pole of the other of the end magnets, plates of magnetically permeable material disposed in face-to-face contact with the south pole of said one end magnet and the north pole of said other end magnet, there being at least two additional magnets located between said end magnets, one of said additional magnets being positioned with its south pole facing the north pole of said one end magnet, the other of said additional magnets being positioned with its north pole facing the south pole of said other end magnet, and magnetically permeable plate means disposed in face-to-face contact with the north pole of said one additional magnet and the south pole of said other additional magnet.

9. Apparatus as defined in claim 8 in which said plate means comprises a pair of plates disposed in face-to-face contact with one another.

* * * * *